US011366048B2

(12) United States Patent
Burriel Maurel et al.

(10) Patent No.: US 11,366,048 B2
(45) Date of Patent: Jun. 21, 2022

(54) SMOKE DETECTOR FOR ASPIRATION SMOKE DETECTOR SYSTEM

(71) Applicant: Carrier Corporation, Palm Beach Gardens, FL (US)

(72) Inventors: Ricard Burriel Maurel, Barcelona (ES); Inigo Barrera Barcelo, L'Hospitalet de Llobregat (ES)

(73) Assignee: CARRIER CORPORATION, Palm Beach Gardens, FL (US)

(*) Notice: Subject to any disclaimer, the term of this patent is extended or adjusted under 35 U.S.C. 154(b) by 0 days.

(21) Appl. No.: 17/100,250

(22) Filed: Nov. 20, 2020

(65) Prior Publication Data

US 2021/0156783 A1 May 27, 2021

(30) Foreign Application Priority Data

Nov. 27, 2019 (EP) .................................... 19383052

(51) Int. Cl.
*G01N 15/06* (2006.01)

(52) U.S. Cl.
CPC ..... *G01N 15/06* (2013.01); *G01N 2015/0693* (2013.01)

(58) Field of Classification Search
CPC ...................................................... G01N 15/06
USPC .......................................................... 356/338
See application file for complete search history.

(56) References Cited

U.S. PATENT DOCUMENTS 7,508,313 B2 3/2009 Cole
7,671,988 B2* 3/2010 Dal Sasso .............. G01N 21/53 356/338
2004/0057050 A1 3/2004 Beck et al.
2007/0127021 A1* 6/2007 Dal Sasso .............. G01N 21/53 356/319
2007/0139649 A1* 6/2007 Siemens .............. G08B 17/107 356/338
2016/0153905 A1* 6/2016 Allemann .............. G01N 21/53 356/338
2017/0046936 A1* 2/2017 Aebersold ............. H01L 31/147
2017/0184447 A1* 6/2017 Matsunami ............ G01N 21/53
2018/0252654 A1* 9/2018 Lincoln .............. G01N 15/0205
(Continued)

FOREIGN PATENT DOCUMENTS

WO 2018015418 A1 1/2018
WO 2018027104 A1 2/2018

OTHER PUBLICATIONS

European Search Report for Application No. 19383052.8; dated Jun. 4, 2020; 11 Pages.

*Primary Examiner* — Tarifur R Chowdhury
*Assistant Examiner* — Omar H Nixon
(74) *Attorney, Agent, or Firm* — Cantor Colburn LLP

(57) ABSTRACT

A smoke detector (100) for use with an aspiration smoke detector (ASD) is described. The smoke detector includes a light source (104) configured to emit a beam of light (108); a reflector (102) including an aperture (110), the aperture aligned with a direction of propagation of the beam of light when no scattering occurs; and a photodetector (106); the reflector configured to reflect light scattered from the beam of light received at the reflector to a single focal point; and the photodetector located at the single focal point. An aspiration smoke detector (ASD) system (2) includes the smoke detector and a method of detecting smoke using the smoke detector.

13 Claims, 2 Drawing Sheets

100 104 106 114 110 108 102 112

(56) References Cited

U.S. PATENT DOCUMENTS

| | | | |
|---|---|---|---|
| 2019/0145883 | A1 | 5/2019 | Burriel et al. |
| 2019/0287364 | A1 | 9/2019 | Birnkrant et al. |

* cited by examiner

SMOKE DETECTOR FOR ASPIRATION SMOKE DETECTOR SYSTEM

FOREIGN PRIORITY

This application claims priority to European Patent Application No. 19383052.8, filed Nov. 27, 2019, and all the benefits accruing therefrom under 35 U.S.C. § 119, the contents of which in its entirety are herein incorporated by reference.

TECHNICAL FIELD OF INVENTION

The present invention relates to a smoke detector for an aspiration smoke detector system, an aspirating smoke detector system comprising the smoke detector and a method of detecting smoke using the smoke detector.

BACKGROUND OF THE INVENTION

Aspiration smoke detector (ASD) systems detect smoke at a centralised detection location. The ASD system draws air from various sampling locations through a network of pipes, the sampled air then being analysed to determine if any smoke is present. Once smoke is detected the ASD system generates an alarm, indicating that the sampled environment is compromised. By using a centralised detection location, ASD systems may sample large areas (e.g. entire and/or multiple floors and rooms of buildings or other structures) with high efficiency.

However, as much as ASD systems generally provide reliable and prompt alarm generation when smoke is detected, ASD systems still have general setbacks.

ASD systems need to be highly sensitive so that smoke can be detected even when the concentration of smoke particles in the sampled air is very low. This need for high sensitivity may affect the type of detecting technology that can be used with an ASD system.

It is therefore desirable to provide an ASD system which can have a high sensitivity.

SUMMARY OF THE INVENTION

Viewed from a first aspect, the invention provides a smoke detector for use with an aspiration smoke detector (ASD) system. The smoke detector comprises: a light source configured to emit a beam of light; a reflector comprising an aperture, wherein the aperture is aligned with a direction of propagation of the beam of light when no scattering occurs; and a photodetector; wherein the reflector is configured to reflect light scattered from the beam of light received at the reflector to a single focal point; and wherein the photodetector is located at the single focal point.

It has been found that using a reflector to reflect light scattered from the beam of light received at the reflector to a single focal point may increase the sensitivity of the detector.

The reflector may be arranged so that all the light received at the reflective surface of the reflector is reflected to the single focal point.

The alignment of the beam of light may be such that when no scattering occurs the beam of light ideally passes through the aperture unhindered. However when scattering occurs, for example due to particulate matter (e.g. smoke) present in a sample within a detection chamber of the smoke detector, the beam may be scattered in various directions. At least some of the scattered light may be received at the reflector. The reflector may then focus any scattered light received at the reflector to the single focal point. In this way, a maximal intensity of light may be collected by the photodetector, which is located at the single focal point. The photodetector may be arranged such that it is receptive to the light focused at the single focal point. In other words, the detecting portion of the photodetector may be described as being coincident with the single focal point.

The photo detector may be for detecting light scattered from the beam of light, e.g. for detecting light scattered towards the reflector which is then reflected to the single focal point.

By using a reflector that may focus the majority of light scattered to a single focal point, the received intensity of light at the photodetector may be higher than if the photodetector were merely to be placed at a location where light may be scattered. In this way, the sensitivity of the smoke detector may be increased and/or the accuracy of any measurements made by the photodetector may be increased. This may allow the detection chamber to be used with a greater number of smoke detecting technologies whilst maintaining an acceptable level of sensitivity required by an ASD smoke detector. For example, a lower intensity light source may be used as the scattered light is better collected at the photodetector, thus decreasing losses present in the smoke detector (i.e. the detection chamber of the smoke detector). Moreover, no additional focusing optics such as lenses or additional reflectors may be required to redirect scattered light to the photodetector. This may allow a reduction in the cost of manufacture for the smoke detector whilst maintaining an acceptable level of sensitivity. This may also improve the reliability of the smoke detector.

The reflector may be configured such that any light collected by the reflector is reflected to a single focal point. It may be a shape of the reflector that is responsible for this phenomenon. The reflector may comprise a curved mirror. For example, the reflector may be or comprise a spherical mirror (e.g. semi- or hemi-spherical mirror) or a parabolic mirror. For example, a spherical mirror may comprise a focal point at the centre of the sphere defined by the spherical mirror whereas a parabolic mirror may comprise a focal point anywhere on the plane of symmetry of the parabolic mirror according to its curvature. The direction of propagation of the beam of light when not scattered may be towards the concave face of the curved reflector (i.e. towards the aperture in the concave face). The light source may be located such that it does not affect the reflection of light from the reflector to the single focal point.

Whilst the term 'mirror' is used herein, the term need not explicitly refer to a surface coated in a reflective metal, but need only refer to any surface comprising a high reflectance. A high reflectance may refer to a reflectance of value greater than 0.9, 0.8 or 0.7, as appropriate. The material of the reflector may be chosen such that the reflectance is optimised for a wavelength or for a range of wavelengths of light emitted by the light source.

The light source may comprise any device capable of emitting a beam of light. The beam may be substantially collimated over the distance between the light source and the aperture. As a result when there is no scattering (i.e. under clean conditions in the detection chamber of the smoke detector) the beam of light should, in its entirety, pass through the aperture. In other words, the divergence of the beam may be such that a beam spot diameter of the beam of light at the aperture is smaller than a diameter of the aperture. Thus, light emitted from the beam of light which is not scattered is not collected by the reflector, and hence is not detected by the photodetector. In other words, under clean conditions in the detection chamber, no light may be detected at the photodetector. This may reduce the background noise of the photodetector and may improve the accuracy of detection at the photodetector.

The light source may be configured to emit a beam of light comprising a first wavelength, and emit a beam of light comprising a second wavelength. For example, the light source may be configured to alternate and/or switch a wavelength of the beam of light between a first wavelength and a second wavelength. Thus, the light source may be configured so that for a period of time the light source may emit light comprising the first wavelength and for a subsequent period of time the light source may emit light comprising the second wavelength. The light source may be arranged to alternate cyclically between emitting light comprising the first wavelength and emitting light comprising the second wavelength.

The beam of light comprising a first wavelength may consist of light at the first wavelength or consist of light at a range of wavelengths including the first wavelength. The beam of light comprising a second wavelength may consist of light at the second wavelength or consist of light at a range of wavelengths including the second wavelength.

The first wavelength and the second wavelength may be different.

The beam of light comprising a first wavelength may not comprise light at the second wavelength. The beam of light comprising a second wavelength may not comprise light at the first wavelength.

The transition between a beam of light comprising the first wavelength and a beam of light comprising the second wavelength may be a step transition. The change in wavelength may be a discrete transition and/or may not be a continuous variation of the wavelength of the light source between the first and second wavelengths.

The light source may be a multi-wavelength light source; i.e. the light source may comprise a single source capable of emitting different wavelengths of light at different times. Alternatively, the light source may comprise a plurality of sources each capable of emitting at least one wavelength of light. In this case, the light emitted from each light source may each propagate at the same angle relative to the photodetector.

Light of different wavelengths may be scattered differently depending on the properties of a particle responsible for scattering the light. The properties may for example be the shape, size, absorption characteristics etc of the particle. The type of particle in a sample may therefore affect the intensity of light scattered of the first wavelength and the light scattered of the second wavelength differently. By comparing the data from the detector for the first wavelength and the second wavelength respectively, a property, such as the size, of a particle detected in the smoke detector may be deduced. As such the smoke detector may be able to discriminate between different types of particles, e.g. different sizes. Different types of particles, e.g. smoke particles, may be related to how the particle was formed during combustion or otherwise.

Advantageously, by being able to discriminate between types of particle by using multiple wavelengths, the smoke detector for the ASD system may only generate an alarm when smoke particles from a fire source or other undesirable source are detected, and nuisance alarms caused by particles from sources such as cooking sources may be ignored.

The differences in the detected signals for the different wavelengths of light for a given particle may be quite small. As a result, it may be desirable to have the smoke detector arranged so that the chance of small differences being detectable is increased. This may be achieved by using the light source for emitting a plurality of wavelengths of light in a smoke detector with a reflector that is configured to reflect light received at the reflector to a single focal point.

One of the first and second wavelengths of light may be or comprise blue visible light or ultraviolet (UV) light. This may have a wavelength in the region of 100 nm to 490 nm. The other of the first and second wavelengths of light may be or comprise red visible light or infrared (IR) light, in the region of 620 nm to 1000 nm.

The light source may be or comprise an LED. Whilst an LED may not emit as coherent and as intense light as a laser, LEDs are vastly cheaper to manufacture. Despite the less desirable emission properties of an LED in comparison to a laser, the use of the reflector that is configured to reflect received at the reflector to a single focal point may result in the smoke detector being sufficiently sensitive to scattered light from a beam of light emitted by an LED for use in an ASD system.

The light source may be or comprise a laser and/or a laser diode. Whilst a laser and/or a laser diode may be a more expensive light source compared to an LED, lasers and/or laser diodes may offer superior emission properties than an LED, including producing a beam of light of higher intensity and/or higher coherence. This may result in a greater detection of scattered light.

The photodetector may be configured to be synchronised with the light source such that it can be determined which wavelength of emitted light the light detected by the photodetector corresponds to. In other words, the detector may be arranged so that it can be determined whether the detected light at the photodetector results from scattering of the light comprising the first wavelength or from scattering of the light comprising the second wavelength. This may be achieved by knowing the times at which the light source emits light comprising the first wavelength and the times at which the light source emits light comprising the second wavelength and knowing the time the detected light is detected at the photodetector.

In this way the light detected by the photodetector may be matched only to a single wavelength of the light emitted by the light source and thus the accuracy of the smoke detector, and hence the ASD system, may be improved. Additionally, by gating the measurement window of the photodetector interference from the other wavelength of light emitted by the light source may be avoided, whilst still being able to use a photodetector that is receptive to all wavelengths. Using a single photodetector sensitive to all wavelengths may reduce manufacture costs, as only a single photodetector needs to be implemented in the system.

Viewed from a second aspect, the invention may provide a smoke detector for use with an aspiration smoke detector (ASD) system. The smoke detector comprises: a light source configured to emit a beam of light; and a photodetector; wherein the light source is configured to alternate a wavelength of the beam of light between a first wavelength and a second wavelength.

It has been found that using a light source configured to alternate a wavelength of the beam of light between a first wavelength and a second wavelength may improve the ability of the smoke detector to discriminate between different types of particles detected.

Light of different wavelengths may be scattered differently depending on the properties of a particle responsible for scattering the light. The properties may for example be the shape, size, absorption characteristics etc of the particle. The type of particle in a sample may therefore affect the intensity of light scattered of the first wavelength and the light of the second wavelength differently. By comparing the data from the detector for the first wavelength and the second wavelength respectively, a property, such as the size, of a particle detected in the smoke detector may be deduced. As such the smoke detector may be able to discriminate between different types of particles, e.g. different sizes. Different types of particles, e.g. smoke particles, may be related to how the particle was formed during combustion or otherwise.

Advantageously, by being able to discriminate between types of particle by using multiple wavelengths, the smoke detector for the ASD system may only generate an alarm when smoke particles from a fire source or other undesirable source are detected, and nuisance alarms caused by particles from sources such as cooking sources may be ignored.

The photodetector may not be aligned with a direction of propagation of the beam of light when no scattering occurs.

The smoke detector of the second aspect may have one or more or all of the features (including optional features) of the smoke detector of the first aspect. Thus the above description may be equally applicable to the smoke detector of the second aspect.

For example, the smoke detector of the second aspect may comprise a reflector that is configured to reflect light scattered from the beam of light received at the reflector to a single focal point (which may be where the photodetector is located).

Also, the photodetector may be configured to be synchronised with the light source such that it can be determined which wavelength of emitted light the light detected by the photodetector corresponds to as described above.

The following features may be features of the smoke detector of the first aspect and/or the second aspect of the present invention.

The smoke detector may comprise a controller. The controller may be in communication with both the photodetector and the light source. Thus the controller may be referred to as a common controller. The controller may be configured to maintain the synchronicity between the light source and the photodetector. The communication may be achieved through wired or wireless connection of the relevant components.

The smoke detector may further comprise a light trap. The light trap may be configured such that any light which is not scattered and/or is not received at the reflector is captured and/or absorbed. For example, the light trap may be configured such that any light which passes through the aperture (if present) in the reflector is captured and/or absorbed. This may prevent light that has passed through the aperture (e.g. non-scattered light) from reflecting back to the photodetector, e.g. it may prevent light reflecting back through the aperture and into the detection chamber.

The smoke detector and/or the detection chamber of the smoke detector may comprise an inlet and an outlet. The inlet may be configured to allow the intake of a sample, for example air, into the detection chamber. The outlet may be configured to allow the exhaust of the sample from the smoke detector and/or detection chamber. The detection chamber may comprise a plenum, defined by the reflector, which the sample is pumped in to.

The smoke detector may comprise a processor. The processor may be configured to analyse the intensity of light detected by the photodetector. The processor may be further configured to cause an alarm signal when it is determined that smoke is detected. The processor may be configured to only generate an alarm signal when it is determined that smoke from an undesirable source is detected.

Viewed from a third aspect, the invention may provide an aspiration smoke detector (ASD) system. The ASD system comprises: the smoke detector as described in the first aspect and/or the second aspect; wherein the ASD system is configured to intake a sample and pass the sample into the smoke detector, e.g. into a detection chamber of the smoke detector.

The ASD system may comprise an inlet, a fan, a filter, and/or an exhaust.

The sample may be from a source in the environment monitored by the ASD system. For example, the sample could be a sample of air from a building where smoke detection may be desirable. The sample may be taken from a heating, ventilation and air-conditioning (HVAC) system in a building. The sample may be drawn into the ASD system by a suction created by the fan. The sample may pass through the inlet. The sample may be passed through the filter.

The filter may be configured to remove any contaminant particulate from the sample, before passing the sample into the detection chamber. Contaminant particulate may include, for example, water and moisture in the sample or dust or other large particles drawn into the ASD system. The removal of contaminant particulate may increase the accuracy of the ASD system by reducing the chance of false-negative readings through erroneous scattering of the beam of light. The removal of contaminant particulate may also increase the operational lifetime of the ASD system. For example, the removal of moisture may prevent condensation from forming within the smoke detector and/or detection chamber which could damage electrical components, cause rusting, or decrease the reflectance of the reflector. The removal of dust and other solid particulate may prevent abrasion of the reflector, which may in time reduce the reflectance of the reflector.

Once the sample has been analysed in the smoke detector/detection chamber, the sample may be exhausted from the ASD system through the exhaust. The pumping effect produced by the fan may create a general flow which actively exhausts the sample from the ASD system.

The sample may not be passed into the detection chamber in its entirety, once drawn into the ASD system. For example, the sample may be split such that only a fraction/portion of the sample is passed into the detection chamber. The remaining sample may then be immediately exhausted from the ASD system.

The ASD system may comprise a network of pipes connected to its inlet. The network of pipes may include a plurality of sampling points dispersed along the network of pipes. As such the sampling area of the ASD system may be large. For example the sampling area may cover a building or be generally representative of a large volumetric space, such as a warehouse. Thus samples from many locations may be pumped to the ASD to be analysed.

Whilst the aforementioned features and their advantages are discussed in relation to apparatus and/or systems comprising smoke detectors that are suitable for use in ASD systems, it will be readily appreciated that any equivalent method and/or process of using such a device and/or performing analogous steps and/or functions as the apparatus and/or systems will benefit from the same technical advantages.

Viewed from a fourth aspect, the invention may provide a method of detecting smoke using a smoke detector for use with an aspirating smoke detector (ASD). The method comprises: providing the smoke detector, wherein the smoke detector comprises a detection chamber with a reflector that is configured to reflect light received at the reflector to a single focal point, passing a sample into the detection chamber; passing a beam of light into the detection chamber; reflecting light scattered by the sample received at the reflector to the single focal point; and detecting, at the single focal point, the scattered light.

When scattering occurs, for example due to particulate matter present in a sample within the detection chamber (e.g. smoke), the beam may be scattered in various directions. The scattered light may be collected and reflected such that the scattered light received at the reflector is reflected and focused to the single focal point. In this way a maximal intensity of light may be detected during detection, which occurs at the single focal point.

By reflecting the light scattered and received at the reflector to the single focal point, the detected intensity of light may be higher than if the method merely detected some scattered light at a location where light may be scattered to with no reflection and/or focusing. Thus the accuracy of any measurements made may be increased. A lower intensity light source may be used as more of the scattered light may be collected before being detected, thus decreasing losses present in the detection chamber.

The reflecting of the scattered light to the single focal point may be achieved due to the shape of the mirror. As such the reflector may comprise a curved mirror. The reflector used may be a parabolic mirror or a spherical mirror (e.g. a hemi- or semi-spherical mirror). The method may further comprise the steps of directing the beam of light towards a concave face of the curved reflector when no scattering occurs and/or locating the light source such that it does not affect the reflection of light from the reflector to the single focal point.

The method may further comprise the step of alternating a wavelength of the beam of light between a first wavelength and a second wavelength. For example, the method may comprise alternating and/or switching a wavelength of the beam of light between a first wavelength and a second wavelength. Thus, the method may involve passing into the detection chamber light comprising the first wavelength for a period of time and may further involve passing into the detection chamber light comprising the second wavelength for a subsequent period of time. The method may involve alternating cyclically between passing into the detection chamber light comprising the first wavelength and emitting light comprising the second wavelength.

The beam of light comprising a first wavelength may consist of light at the first wavelength or consist of light at a range of wavelengths including the first wavelength. The beam of light comprising a second wavelength may consist of light at the second wavelength or consist of light at a range of wavelengths including the second wavelength.

The first wavelength and the second wavelength may be different.

The beam of light comprising a first wavelength may not comprise light at the second wavelength. The beam of light comprising a second wavelength may not comprise light at the first wavelength.

The transition between a beam of light comprising the first wavelength and a beam of light comprising the second wavelength may be a step transition. The change in wavelength may be a discrete transition and/or may not be a continuous variation of the wavelength between the first and second wavelength.

The beam of light may be passed into the detection chamber by a light source. The light source may be a multi-wavelength light source; i.e. the light source may comprise a single source capable of emitting different wavelengths of light at different times. Alternatively, the light source may comprise a plurality of sources each capable of passing into the detection chamber at least one wavelength of light.

The method may further comprise the steps of synchronising the detection of the scattered light with the alternating of the wavelength of the beam of light; and determining which wavelength of the beam of light emitted the detected light corresponds to. In other words, the detection may involve determining whether the detected light at the photodetector results from scattering of the light comprising the first wavelength or from scattering of the light comprising the second wavelength. This may be achieved by knowing the times at which the light source emits light comprising the first wavelength and the times at which the light source emits light comprising the second wavelength and knowing the time the detected light is detected at the photodetector.

In this way the light detected by the photodetector may be matched only to a single wavelength of the light emitted by the light source and thus the accuracy of the smoke detector, and hence the ASD system, may be improved. Additionally, by gating the measurement window of the photodetector interference from the other wavelength of light emitted by the light source may be avoided, whilst still being able to use a photodetector that is receptive to all wavelengths. Using a single photodetector sensitive to all wavelengths may reduce manufacture costs, as only a single photodetector needs to be implemented in the system.

Light of different wavelengths may be scattered differently depending on the properties of a particle responsible for scattering the light. The properties may for example be the shape, size, absorption characteristics etc. of the particle. The type of particle in a sample may therefore affect the intensity of light scattered of the first wavelength and the light of the second wavelength differently. By comparing the data from the detector for the first wavelength and the second wavelength respectively, a property, such as the size, of a particle detected in the smoke detector may be deduced.

As such the method may comprise the step of determining a size of a smoke particle based on the scattered light detected and/or discriminating between different types of particles based on the scattered light detected. The types of particles may be particles of different properties, e.g. different sizes. Different types of particles, e.g. smoke particles, may be related to how the particle was formed during combustion or otherwise.

Advantageously, by being able to discriminate between types of particle by using multiple wavelengths, the method of smoke detection using a smoke detector may only generate an alarm when smoke particles from a fire source or other undesirable source are detected, and nuisance alarms caused by particles from sources such as cooking sources may be ignored.

The method may further comprise the step of detecting smoke and/or particulate from an undesirable source. The undesirable source may be identified based on the determination of the particle. For example, if the particle is determined as being of a certain size it may be possible to determine that the particle originated from a cooking source. Similarly, the determination may confirm that the particle identified is in fact smoke from a fire source, and as such smoke is detected.

The differences in the detected signals for the different wavelengths of light for a given particle may be quite small. As a result, it may be desirable to have a method of detecting smoke which increases the chance of small differences being detectable. This may be achieved by using the light source for emitting a plurality of wavelengths of light in a smoke detector with a reflector that is configured to reflect light received at the reflector to a single focal point.

Viewed from a fifth aspect, the invention may provide a method of detecting smoke using a smoke detector for use with an aspirating smoke detector (ASD). The method comprises: providing the smoke detector with a detection chamber and a light source that is configured to emit a beam of light; passing a sample into the detection chamber; passing a beam of light into the detection chamber; alternating a wavelength of the beam of light between a first wavelength and a second wavelength; and detecting light scattered by the sample.

The method of the fifth aspect may have one or more or all of the features (including optional features) of the method of the fourth aspect. Thus the above description of the method of the fourth aspect may be equally applicable to the method of the fifth aspect.

For example, the method of the fifth second aspect may comprise the steps of synchronising the detection of the scattered light with the alternating of the wavelength of the beam of light; and determining which wavelength of the beam of light emitted the detected light corresponds to. In other words, the detection may involve determining whether the detected light at the photodetector results from scattering of the light comprising the first wavelength or from scattering of the light comprising the second wavelength as described above in relation to the fourth aspect.

The method of the fifth aspect may also comprise providing the smoke detector with a reflector that is configured to reflect light received at the reflector to a single focal point; and reflecting light scattered by the sample received at the reflector to the single focal point as described above in relation to the fourth aspect.

The following features may be applied to the methods of the fourth aspect and/or the fifth aspect of the present invention.

The method may comprise the step of analysing the light detected. The method may comprise generating an alarm signal in response to detecting smoke and/or particulate. The method may further comprise generating an alarm signal in response to detecting smoke and/or particulate from an undesirable source.

The method may comprise filtering the sample to remove contaminant particulate, before it passing the sample into the detection chamber. This may advantageously remove dust, water and/or moisture from the sample.

The smoke detector of the fourth and/or fifth aspect may be the smoke detector of the first aspect and/or of the second aspect. For example, the reflecting may be performed using the reflector, the emitting may be performed using the light source, and the detecting may be performed using the photodetector. These may each have one or more or all of the optional features discussed above. The synchronising may similarly be performed by the controller. Further, the absorbing/capturing of any light not scattered by the sample may be performed using the light trap. The analysing the light detected and the generating an alarm signal when smoke and/or particulate from an undesirable source is detected may be performed using the processor.

The method of the fourth and/or fifth aspect may comprise providing the smoke detector of the first and/or second aspect (optionally including one or more or all of the optional features).

BRIEF DESCRIPTION OF THE DRAWINGS

Certain example embodiments of the invention will now be described by way of example only and with reference to the accompanying drawings in which.

DETAILED DESCRIPTION OF THE INVENTION

Figure 1:
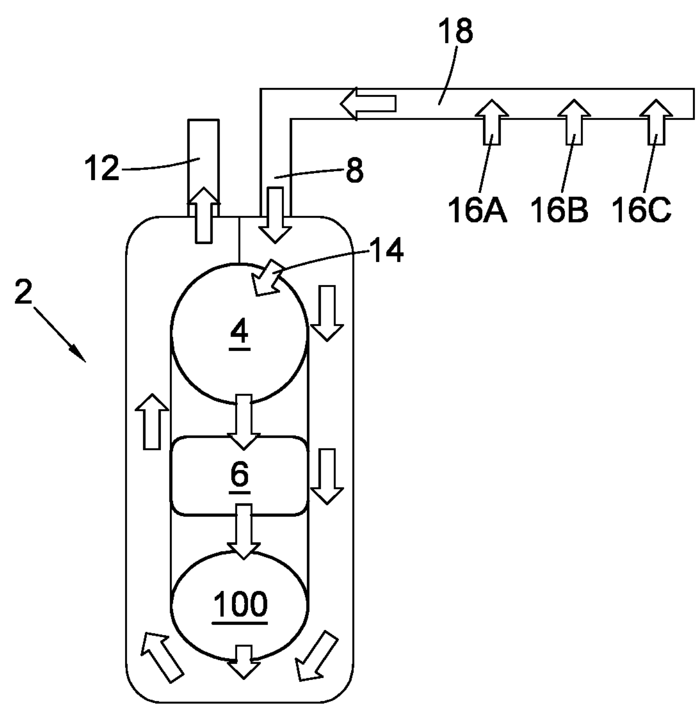
FIG. 1 shows a schematic diagram of an ASD system.

With reference to FIG. 1, an ASD system 2 comprises a fan 4, a filter 6, a smoke detector 100, an inlet 8, an exhaust 12, and a plurality of sampling points 16 dispersed along a network of pipes 18.

The network of pipes 18 covers an area/environment to be monitored for smoke generation. Dispersed along the network of pipes are a plurality of sampling points 16. Whilst three sampling points 16A, 16B, 16C are shown in FIG. 1 any number of sampling points could be implemented into the ASD system 2 as appropriate. The sampling points 16 comprise an inlet, for example a small hole, which allows air to flow into the network of pipes 18 and be drawn into the ASD system 2. To draw the air in to be sampled, the ASD system 2 also comprises the fan 4. The fan 4 creates an airflow which leads to the intake of air and also exhausts air and/or samples 14 from the ASD system once no longer needed.

The fan 4 shown in FIG. 1 diverts a portion of the air drawn in to use as a sample 14, to determine if smoke is present in the environment. The remaining air may be immediately exhausted from the ASD system 2 via the exhaust pipe 12. Whilst FIG. 1 shows a sample of air 14 being diverted from the air drawn in, in some cases all the air drawn in may be analysed for the presence of smoke.

The sample 14 is passed through a filter 6. The filter 4 is configured to remove dust and/or moisture from the ASD system 2 before being passed to the smoke detector 100. The removal of dust and/or moisture (i.e. water droplets) may prevent particles that do not constitute smoke entering the smoke detector 100 and potentially generating a false alarm. Similarly, filtering the sample may protect sensitive equipment housed in the smoke detector 100 from being damaged over time. Once filtered, the sample 14 is passed into the smoke detector 100.

Figure 2:
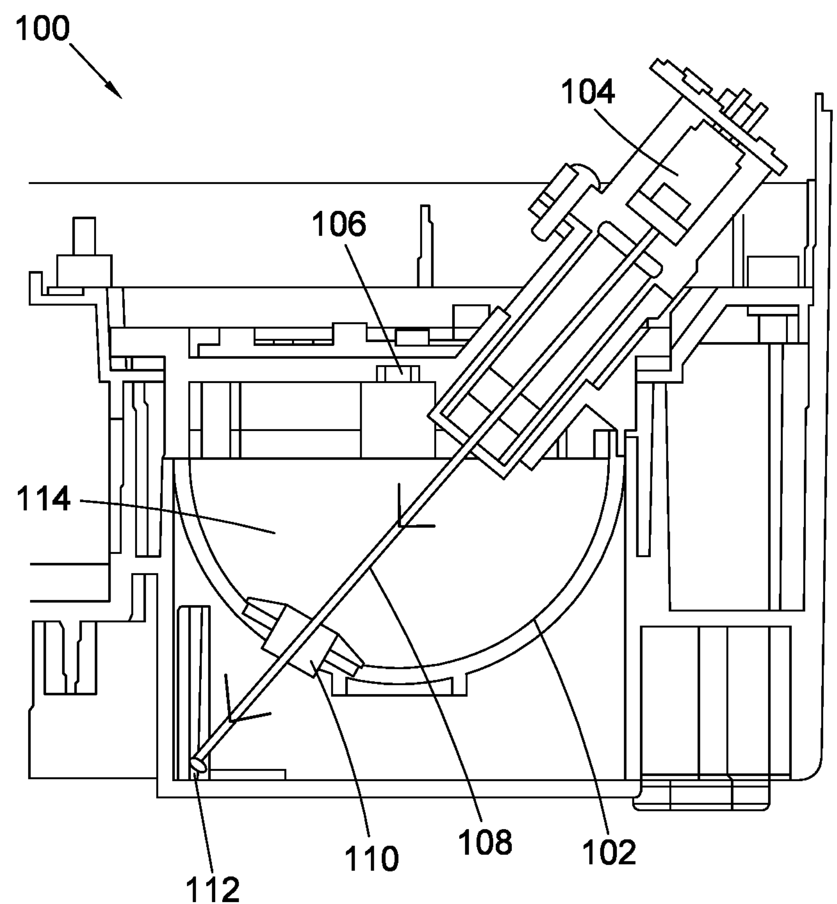
FIG. 2 shows a cross-section of a smoke detector.

Turning to FIG. 2, the smoke detector 100 comprises a reflector 102, a light source 104, a photodetector 106, an aperture 110, a light trap 112 and a plenum 114. The general function of the smoke detector 100 will now be briefly described.

The sample 14 is directed into the plenum 114. The light source 104 emits a beam of light 108, the beam of light 108 passing through the sample 14 occupying the plenum 114. Whilst some of the light will pass through the aperture 110 in the reflector 102 and be evacuated from the plenum 114, some of the light may be scattered if particles (e.g. smoke) are present in the plenum 114. The scattered light is collected by the reflector 102. The reflector is configured such that any light it reflects will be focused to a single focal point. The single focal point is known, and the photodetector 106 is located at the single focal point such that is will receive any scattered light which is reflected by the reflector 102. The photodetector 106 then measures an intensity of light received at the photodetector 106, such that it may be determined whether or not particulate and/or smoke is present in the sample 14.

The mechanisms by which light is scattered by particulate and/or smoke in the sample 14 will be readily understood by the skilled person, so will not be discussed in detail. The main source of scattering of the beam of light 108 is Rayleigh scattering, which is dependent on the wavelength of light scattered and the size of the particle which scatters the light.

The light source 104 emits the beam of light 108 through the plenum 114. The light source 104 shown is a single light source 104. However, a plurality of light sources 104 may be used in the smoke detector 100, if required. The light source 104 may be an LED, laser diode or laser. The beam of light 108 is aligned with the aperture 110, such that when no scattering occurs (e.g. when there are clean conditions in the plenum 114) the beam of light 108 passes fully out the plenum 114. To prevent any light not scattered from returning into the plenum 114, once the beam of light 108 has passed through the aperture 110 it is configured to be incident on the light trap 112. The light trap 112 absorbs and/or captures the light incident on it, preventing the light from returning to the plenum 114. This may aid in reducing a background of light detected by the photodetector 106.

To further ensure that when no scattering occurs a maximum, and preferably an entirety, of the beam of light 108 passes through the aperture 110, the beam of light 108 emitted by the light source 104 may be configured such that it is collimated for the path length it travels through the plenum 114. In other words, the divergence of the beam of light 108 may be minimised such that a diameter of the beam spot of the beam of light 108 at the aperture 110, is smaller than a diameter of the aperture 110 itself.

When scattering of the beam of light 108 does occur, at least some (if not a majority) of the scattered light is collected by the reflector 102. The reflector 102 reflects the scattered light to a single focal point, increasing the efficiency of detection at the photodetector 106 which is located at the single focal point. This beneficially means that the light source 104 may be of a lower power and/or produce a beam of light 108 of lower initial intensity and/or a detection may be made when less scattering occurs (e.g. when the concentration of particles in the plenum 114 is very low). In the case of FIG. 2 a spherical mirror is shown. However, any reflective member which is configured to focus light to a single focal point may be used as appropriate. This may include, but is not limited to, other curved reflectors 102 such as parabolic mirrors.

The focal point of the reflector 102, especially for a curved reflector such as a spherical or parabolic mirror, will often lie on a plane of symmetry of the curvature of the reflector 102. As such the light source 102 should not be aligned such that the beam of light 108 is shone through the single focal point when no scattering occurs. Thus, the light source 104 should ideally be located to the side of the single focal point, as shown in FIG. 2, in such a way that the light path of the scattered light reflected by the reflector 102 is not obstructed and/or interfered with, or at least minimised.

The light source 104 may emit a beam of light 108 of a single wavelength, or may be capable of emitting beams of light 108 of different wavelengths. For example, the light source 104 may emit a beam of light 108 of a first wavelength for a period of time $T_1$. The light source 104 may then emit a beam of light 108 of a second wavelength for a period of time $T_2$. $T_1$ and $T_2$ may be the same length of time, or may differ. The light source 104 may alternate between the two wavelengths cyclically, or as required. The first wavelength may consist of generally red/IR light of wavelength 620 nm$\leq\lambda_1\leq$1000 nm, whilst the second wavelength may consist of generally blue/UV light of wavelength 100 nm$\leq\lambda_2\leq$490 nm.

As will be readily understood by the skilled person, particles of different sizes scatter wavelengths of different lengths differently. For example, under a Rayleigh scattering regime the intensity I of the scattered light will be governed by the following relationship:

$$I \alpha \frac{r^6}{\lambda^4} \tag{1}$$

wherein r is the radius of the particle and λ is the wavelength of the light scattered. As such, larger particles will generate a higher intensity of scattering for the same wavelength, whilst shorter wavelengths will experience more scattering than a longer wavelength for the same particle size.

Thus, by knowing an expected scattering relationship for particles of different sizes, the size of the particle may be determined based on how light of different wavelengths is scattered in the smoke detector 100. As such the use of a light source 104 emitting light of two different wavelengths may allow the smoke detector 100 to be able to discriminate between particles of different sizes detected in the sample 14.

Further, the photodetector 106 may be synchronised with the light source 104 such that when the light source 104 emits the beam of light 108 of the first wavelength, the photodetector 106 matches its measurements to the first wavelength. When the light source 104 emits the beam of light 108 of the second wavelength, the photodetector 108 then matches its measurements to the second wavelength. By synchronising the measurements of the photodetector 106 (i.e. gating the measurement window of the photodetector 106 accordingly) to the alternation of the wavelength of the beam of light 108 emitted by the light source 104, the intensity of scattered light to each wavelength may be clearly matched and thus the analysis of the sample improved.

The difference of the intensity of scattered light related to the differing particle sizes and/or differing wavelengths may be slight. Thus, by utilising the reflector 102 in combination with the light source 104 emitting beams of light 108 of differing wavelengths the overall ability of the smoke detector 100 to detect and discriminate smoke from various sources, such as cooking sources and/or nuisance sources may be improved.

To maintain synchronicity between the photodetector 106 and the light source 104, a controller (not shown) may be in communication with the components. The controller may be a 'common controller'. The controller may receive information from the light source and the photodetector such that the reading from the photodetector can be synchronised (i.e. matched) with the light source that caused that reading.

What is claimed is:

1. A smoke detector for use with an aspiration smoke detector (ASD) system, the smoke detector comprising:

a light source configured to emit a beam of light;

a reflector comprising an aperture, wherein the aperture is aligned with a direction of propagation of the beam of light when no scattering occurs; and a photodetector;

wherein the reflector is configured to reflect light scattered from the beam of light received at the reflector to a single focal point; and wherein the photodetector is located at the single focal point;

wherein the light source is configured to alternate a wavelength of the beam of light between a first wavelength and a second wavelength; and wherein a change in wavelength of the beam of light between the first wavelength and the second wavelength is a discrete transition.

2. A smoke detector as claimed in claim 1, wherein the reflector is a spherical mirror or a parabolic mirror.

3. A smoke detector as claimed in claim 1, wherein the light source is configured such that a divergence of the beam of light is such that the beam of light passes entirely through the aperture when no scattering occurs.

4. A smoke detector as claimed in claim 1, wherein the photodetector is configured to be synchronised with the light source such that it can be determined which wavelength of emitted light the light detected by the photodetector corresponds to.

5. A smoke detector as claimed in claim 4, wherein the smoke detector further comprises a controller in communication with the light source and the photodetector, and wherein the controller is configured to synchronise the light source and the photodetector.

6. A smoke detector as claimed in claim 1, wherein the smoke detector further comprises a light trap, and wherein the light trap is configured to absorb and/or capture any light passing through the aperture.

7. An aspiration smoke detector (ASD) system, the ASD system comprising:

the smoke detector of claim 1;

wherein the ASD system is configured to intake a sample and pass the sample into the smoke detector.

8. A method of detecting smoke using a smoke detector, wherein the smoke detector is the smoke detector as claimed in claim 1.

9. A method of detecting smoke using a smoke detector for an aspiration smoke detector (ASD) system, the method comprising:

providing the smoke detector, wherein the smoke detector comprises a detection chamber with a reflector that is configured to reflect light received at the reflector to a single focal point;

passing a sample into the detection chamber;

passing a beam of light into the detection chamber;

reflecting light scattered by the sample received at the reflector to the single focal point; and detecting, at the single focal point, the scattered light;

alternating a wavelength of the beam of light between a first wavelength and a second wavelength; and wherein a change in wavelength of the beam of light between the first wavelength and the second wavelength is a discrete transition.

10. A method of detecting smoke as claimed in claim 9, wherein the reflector is a spherical mirror or a parabolic mirror.

11. A method as claimed in claim 9, further comprising the steps of:

synchronising the detection of the scattered light with the alternating of the wavelength of the beam of light; and determining which wavelength of the beam of light emitted the detected light corresponds to.

12. A method as claimed in claim 9, further comprising the step of:

determining a size of a smoke particle based on the scattered light detected.

13. A method as claimed in claim 9, further comprising the step of:

absorbing and/or capturing any light not scattered.

* * * * *